(12) United States Patent
Zhu et al.

(10) Patent No.: US 7,194,933 B2
(45) Date of Patent: Mar. 27, 2007

(54) COMPOSITE CIRCULAR SLICER KNIFE

(75) Inventors: Guangshan Zhu, Troy, OH (US); Shahram Shariff, Dayton, OH (US); Doug McGuffin-Noll, Springboro, OH (US)

(73) Assignee: Premark FEG L.L.C., Wilmington, DE (US)

( * ) Notice: Subject to any disclaimer, the term of this patent is extended or adjusted under 35 U.S.C. 154(b) by 366 days.

(21) Appl. No.: 10/186,735

(22) Filed: Jul. 1, 2002

(65) Prior Publication Data

US 2004/0000060 A1    Jan. 1, 2004

(51) Int. Cl.
*B21K 11/02* (2006.01)
(52) U.S. Cl. ............... 76/115; 30/347; 30/350
(58) Field of Classification Search ................. 30/350, 30/276, 347, 348; 76/115, 112; 228/170; 56/295
See application file for complete search history.

(56) References Cited

U.S. PATENT DOCUMENTS

| | | | | | |
|---|---|---|---|---|---|
| 1,150,113 | A | * | 8/1915 | Haynes | 420/36 |
| 1,669,088 | A | * | 5/1928 | Johnson | 83/675 |
| 1,709,606 | A | * | 4/1929 | Catland | 76/108.1 |
| 1,859,978 | A | * | 5/1932 | Metzger | 175/373 |
| 1,932,563 | A | | 10/1933 | Thewes | |
| 2,167,015 | A | | 7/1939 | Waage | |
| 2,961,762 | A | * | 11/1960 | Clark et al. | 228/170 |
| 3,360,846 | A | * | 1/1968 | Schellstede et al. | 29/447 |
| 3,593,600 | A | * | 7/1971 | Adams et al. | 76/112 |
| 3,730,038 | A | * | 5/1973 | Farb | 83/837 |
| 4,428,260 | A | * | 1/1984 | Eby | 76/104.1 |
| 4,793,065 | A | | 12/1988 | Johansson | |
| 4,860,450 | A | | 8/1989 | Achille | |
| 4,982,720 | A | | 1/1991 | Matsuda | |
| 4,993,157 | A | | 2/1991 | Wang | |
| 5,018,276 | A | | 5/1991 | Asada | |
| 5,129,296 | A | | 7/1992 | Wayne | |
| 5,297,637 | A | | 3/1994 | Rowlett | |
| 5,429,016 | A | | 7/1995 | Rowlett | |
| 5,582,041 | A | * | 12/1996 | Spiess | 69/37 |

FOREIGN PATENT DOCUMENTS

| | | |
|---|---|---|
| DE | 19530641 | 11/1996 |
| DE | 19823413 | 12/1999 |
| EP | 0042586 | 12/1981 |
| EP | 0707921 | 4/1996 |
| EP | 1066913 | 1/2001 |
| FR | 2458973 | 1/1981 |
| GB | 665983 | 2/1952 |
| JP | 5817238 | 10/1983 |
| NL | 75570 | 8/1954 |

OTHER PUBLICATIONS

Netherlands Patent No. 75570 English Translation.

* cited by examiner

*Primary Examiner*—Hwei-Siu Payer
(74) *Attorney, Agent, or Firm*—Thompson Hine, LLP (57) ABSTRACT

A substantially circular slicer knife is provided having an interior base portion made of a first material and an outer edge portion made of a second material. The outer edge portion is metallurgically bonded to the interior base portion.

24 Claims, 8 Drawing Sheets

COMPOSITE CIRCULAR SLICER KNIFE

TECHNICAL FIELD

The present application relates generally to rotating, circular slicer knives such as those used in commercial food product slicers, and more particularly, to a composite circular slicer knife in which a first material forms an inner portion of the knife and a second material forms a continuous cutting edge of the slicer knife.

BACKGROUND

Circular slicer knives are used to slice meat and other food products. In operation a slicer knife is mounted for rotation on a commercial food slicing device and a food product positioned on a reciprocating tray or carriage is brought into contact with the rotating knife via movement of the tray or carriage past the knife. When a rotating cutting edge of the slicer knife contacts the food product, a portion of the food product is removed for consumption or packaging. Exemplary food product slicers are disclosed in U.S. Pat. Nos. 6,119,566 and 5,970,840.

Currently available slicer knives are commonly made from a single material that exhibits suitable toughness and resistance to corrosion as needed to provide a good cutting edge where the knife experiences the most loading and wear. By contrast, the interior body of the slicer knife acts primarily mount for connecting the knife to a slicer, and therefore experiences less impact loading and wear than the cutting edge and the toughness of the body portion of the knife need not be as high as at the cutting edge. As toughness increases, formability and machining can become more difficult. Accordingly, currently available slicer knives using a single material to produce both the cutting edge of the slicer knife and the interior body of the slicer knife compromise between using a material with suitable properties for the cutting edge and using a material that can still be manufactured in a commercially viable and economic manner. The use of a single high performance material to produce both the cutting edge and the interior body of a slicer knife may result in increased processing costs. For example, many manufacturers produce circular knives using hi-Carbon steel, hardening the steel and plating the steel for the purpose of corrosion resistance. The process may involve machining the knife along substantially its entire radius to achieve a desired contour.

In the case of a known two material knife as described in Dutch Patent No. 75570, the knife includes a cutting ring that is held under tension against a seat portion of a knife carrier. This two-piece knife construction poses problems with the cutting ring coming off of the knife carrier during slicing operations and with sanitation and cleanability at the interface of the two knife parts.

Accordingly, it would be advantageous to provide an improved slicer knife.

SUMMARY

In one aspect, a slicer knife is provided including an interior base portion comprising a first material and an outer edge portion comprising a second material and forming a cutting edge of the slicer knife. The outer edge portion is metallurgically bonded to the interior base portion. The second material may have superior properties suitable for a knife edge as compared to the first material.

In another aspect, a method of manufacturing a slicer knife involves providing a knife base of a first material; applying a second material to the knife base via a welding process to metallurgically bond the second material to the knife base, forming a knife blank; and machining the knife blank to form a continuous cutting edge defined by the second material.

In a further aspect, a method of manufacturing a substantially circular slicer knife involves providing a knife base portion of a first material; providing a knife edge portion of a second material; and metallurgically bonding the knife edge portion to the knife base portion so as to permanently secure the knife edge portion to the knife base portion.

In yet another aspect, a composite knife blank usable in the manufacture of a circular slicer knife includes a base portion made of a first material and having a continuous groove following a substantially circular edge of the base portion, and a second material within the continuous groove and metallurgically bonded to the first material.

DETAILED DESCRIPTION

Figure 1:
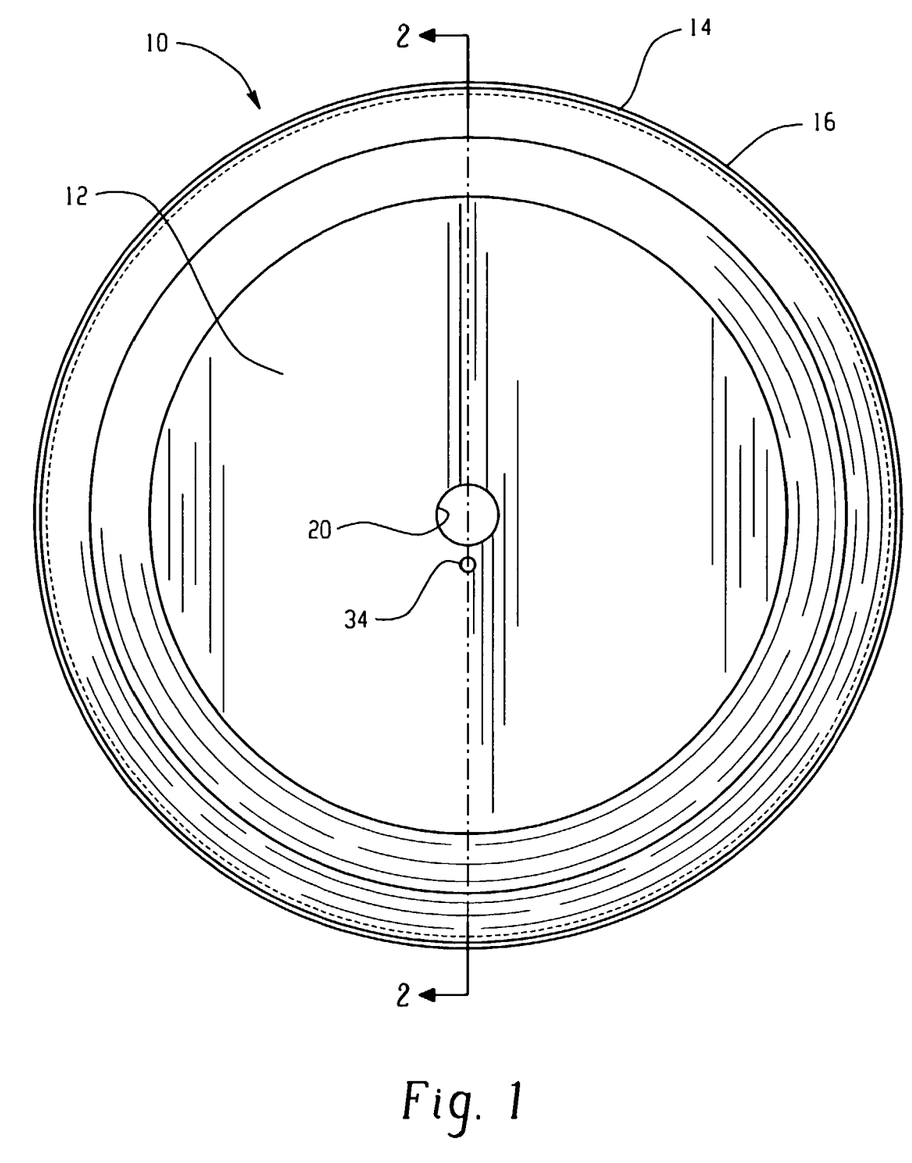
FIG. 1 is a top view of one embodiment of a composite slicer knife.
Figure 2:
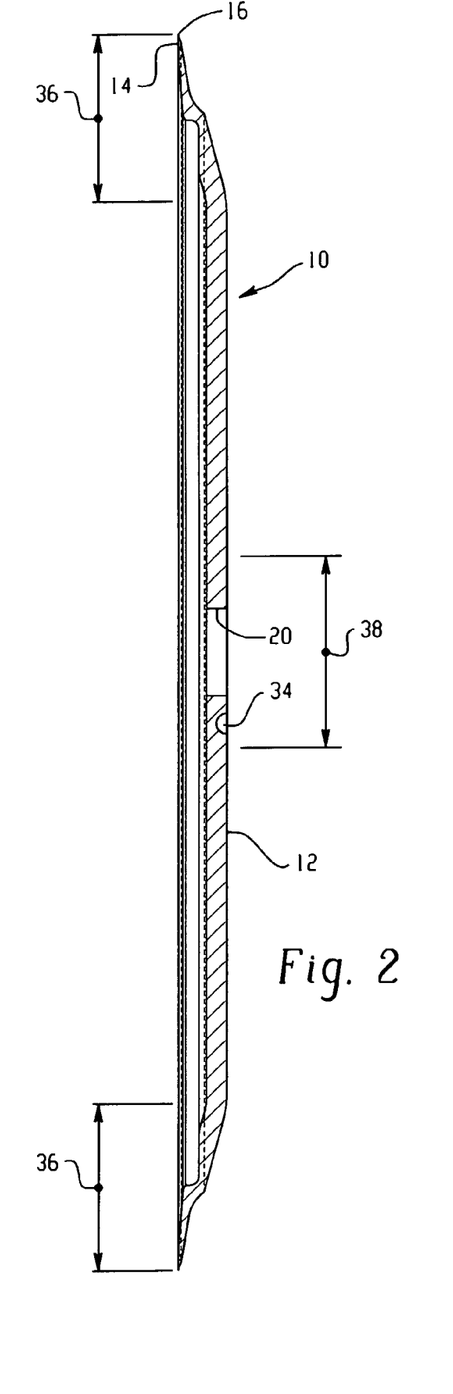
FIG. 2 is a side cross-section view of the composite slicer knife of FIG. 1 along line 2—2.
Figure 3:
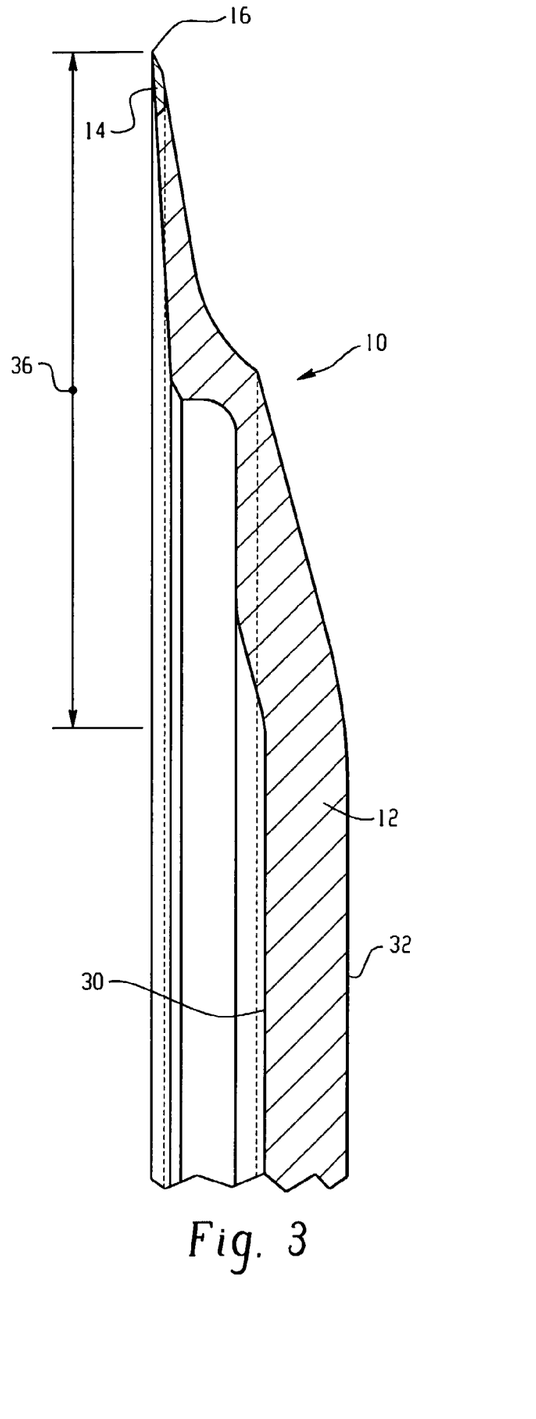
FIG. 3 is an enlarged view of the upper portion of FIG. 2.

Referring to FIGS. 1–3, a substantially circular slicer knife 10 is shown. The slicer knife 10 includes an interior base portion 12 made from a first material and an outer edge portion 14, which may be annular, made from a second material. The outer edge portion 14 is metallurgically bonded to the interior base portion 12. The edge portion 14 is more than a mere coating and has sufficient width along the radius to permit long life under sharpening conditions. In one embodiment, the radial width of the edge portion is at least ¼".

The base portion first material may be a 300 series stainless steel such as a 304L SST. This material provides good corrosion resistance and is cut, formed and machined relatively easily. Of course, other materials could be used for the base portion 12. The second material may be a material having better knife edge characteristics or properties, such as toughness and wear resistance (both chemical and mechanical), than the first material. One example of a satisfactory material is a cobalt-based alloy sold under the trademark STELLITE® by Deloro Stellite Inc., of St. Louis, Mo. In particular, Stellite Alloy 6, also referred to simply as Stellite 6, which has a chemical composition as shown below in Table 1, is suitable for use as the second material.

TABLE 1

| Desig-nation | % by Weight | | | | | | | | |
|---|---|---|---|---|---|---|---|---|---|
| | C | Co | Cr | Fe | Mn | Mo | Ni | Si | W |
| Stellite 6 | 1.15 | Balance | 27.75 | 3.0* | 1.0* | 1.0* | 3.0* | 1.15 | 4.5 |

*maximum percentage by weight

Stellite 6 has a relatively high tensile strength (121 KSI), high hardness (HRC 38-50), and excellent corrosion resistance. Of course, other materials may be used for the outer edge portion 14, which forms the substantially circular cutting edge 16 of the slicer knife 10, provided that the material exhibits properties acceptable for a food slicing application or other application for which the knife is to be used. One alternative to STELLITE® alloys are TRIB-ALOY® alloys, also sold by Deloro Stellite Inc.

In general it is recognized that more suitable knife constructions may be provided by forming the outer edge portion 14 of a second material having a combination of strength, hardness and toughness that is qualitatively better than that of the first material. The "toughness" of a material can be defined as the ability of the material to absorb mechanical energy without fracturing or cracking, and can be defined as the energy per unit volume that has been dissipated up to fracture. It is recognized that more suitable constructions may often be provided by using a second material that is higher in tensile strength and hardness than the first material. In one construction the second material has a toughness greater than or equal to $15 \times 10^6$ J/m$^3$, a tensile strength that is greater than or equal to 100 KSI and a hardness that is greater than or equal to 38 HRC.

The interior base portion 12 of the slicer knife 10 may be much larger by area than the outer edge portion 14, and may be made from a first material which is easy to process and machine. The outer edge portion 14 of the slicer knife 10, which forms the cutting edge 16, may be made from a second material that exhibits higher strength and durability than the first material. By combining two materials to produce the slicer knife 10, and by localizing the stronger and more durable second material near the cutting edge 16 of the slicer knife 10, the slicer knife 10 may have higher quality and may be more cost efficient to produce than a slicer knife manufactured from a single material.

Figure 4:
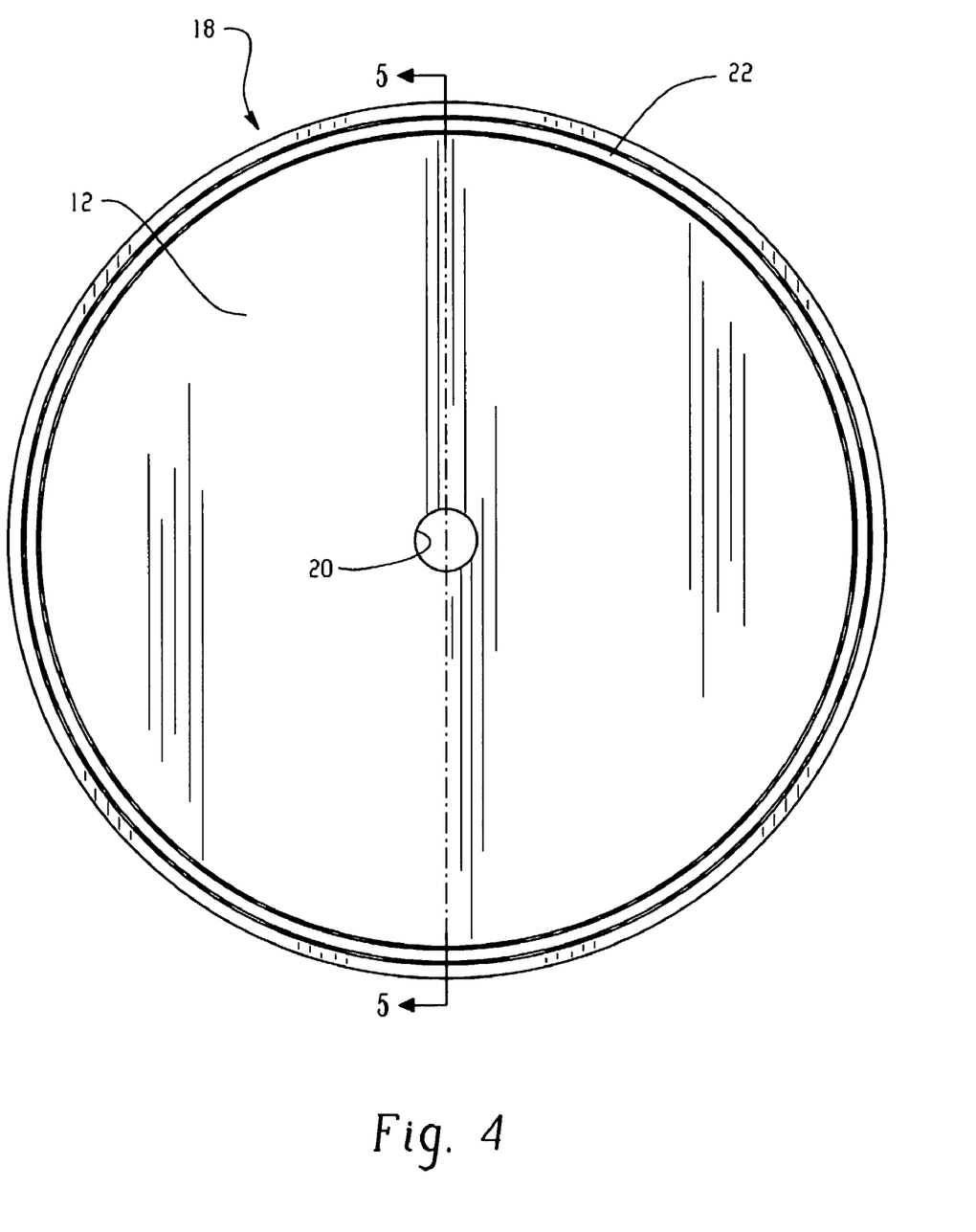
FIG. 4 is a top view of one embodiment of a knife blank used to manufacture the composite slicer knife.
Figure 5:
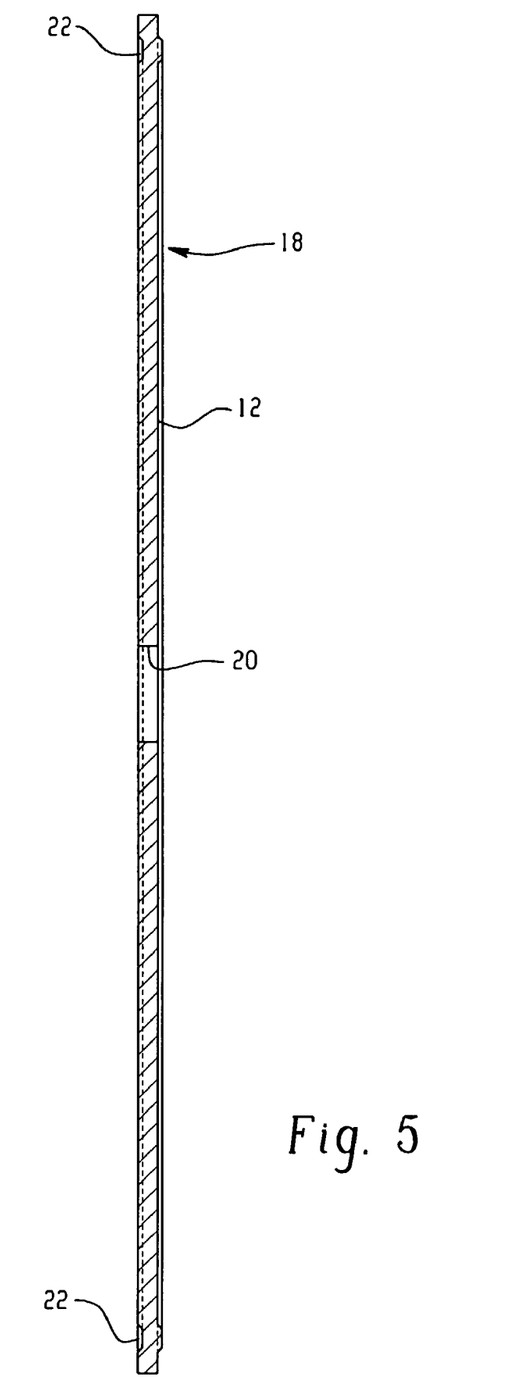
FIG. 5 is a side cross section view of the knife blank of FIG. 4 along line 5—5.
Figure 6:
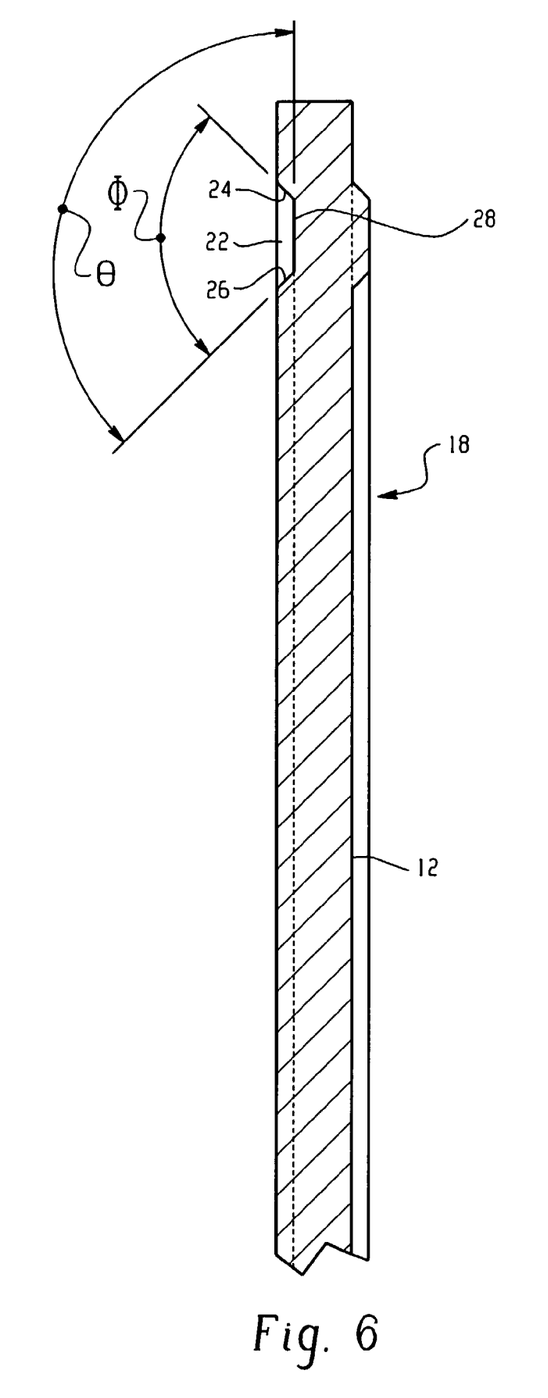
FIG. 6 is an enlarged view of the upper portion of FIG. 5.

An exemplary knife manufacturing method is now discussed in detail. To produce the composite slicer knife 10, a knife base 18, shown in FIGS. 4–6, may be cut out from a sheet of the first material. Stamping, laser cutting, or other cutting methods may accomplish the step of cutting. The knife base 18 may be cut so as to have a substantially circular or disc shape and may be cut to include a center hole 20. The hole 20 may be used to allow the knife base 18 to be mounted on a shaft for additional machining operations or to be mounted on a conventional food slicing device for use in slicing operations. It is recognized that the knife base shape could be other than circular, although the circular or disc shape may be most convenient.

A continuous weld receiving pocket, such as a groove 22, may be formed near a substantially circumferential edge of the knife base 18. The groove may be annular and may be formed by stamping, cutting, or other processes. As shown most clearly in FIG. 6, in the illustrated embodiment the lateral walls 24, 26 of the groove 22 may angle outwardly from the base or bottom portion 28 of the groove 22 such that a width of the exposed opening at the top of the groove 22 is greater than a width of the bottom portion 28 of the groove 22. In one embodiment, the angle θ between each lateral wall 24, 26 of the groove 22 and the bottom surface 28 of the groove 22 may be about 135° plus or minus 10° (about 125° to about 145°). Accordingly, the angle Φ defined between each lateral wall 24, 26 of the groove 22 may be about 90° plus or minus 20° (about 70° to about 110°). In an alternative embodiment in which the bottom portion 28 of the groove 22 is not flat, each lateral wall 24, 26 of the groove 22 may form a respective angle θ in a range of between about 125° and about 145° with a plane defined by the bottom of the continuous groove 22. The purpose of utilizing a groove 22 with the described configuration will be explained below.

Figure 7:
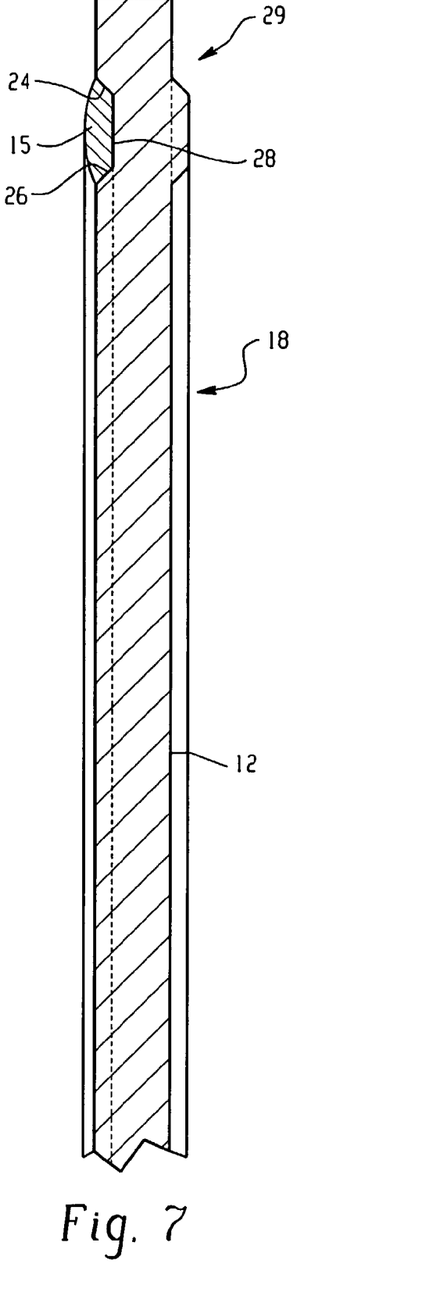
FIG. 7 shows a second material applied to the groove of FIG. 6.

Referring to FIG. 7, the second material 15 is applied to the groove 22 so as to result in a metallurgical bond between the interior base portion 12 and edge portion 14 of the resulting knife. Accordingly, the outer edge 14 of the resulting knife does not need to be mechanically attached to knife base 18 by conventional fasteners. The second material can be applied to the groove 22 via any suitable welding process. For example, a deposition welding process such as plasma transferred arc or thermal spray with fusing might be used in which case the second material is metallurgically bonded to the first material. Other welding techniques might involve the use of a third material to metallurgically bond the knife base portion 12 and the knife edge portion 14. In the case of a plasma transferred arc deposition welding, the second material could be applied to the groove 22 via a single pass around the continuous groove, or multiple passes around the groove could be used in which case the second material would be built up in multiple layers within the groove 22. In the illustrated example the second material 15 extends slight above the surface of the knife base after being applied.

In order to reduce voids between the powdered second material and the groove 22, thus improving the bond between the second material and the knife base 18, the groove 22 may be configured as described above with non-parallel lateral walls 24, 26 that angle outwardly from the bottom portion 28 of the groove 22. By eliminating sharp angles between the lateral walls 24, 26 and the bottom portion 28 of the groove 22, the second material is able to more completely settle into the groove 22 when the deposition welding process is performed, thereby reducing voids or air pockets. However, other groove or pocket configurations could be used. For example, providing a series of radial cuts or any other configuration could be used to enhance surface area or bond are between the resulting knife base portion 12 and knife edge portion 14. Referring to FIG. 7, applying the second material to the groove 22 of the knife base 18 produces a composite knife blank 29.

Figure 8:
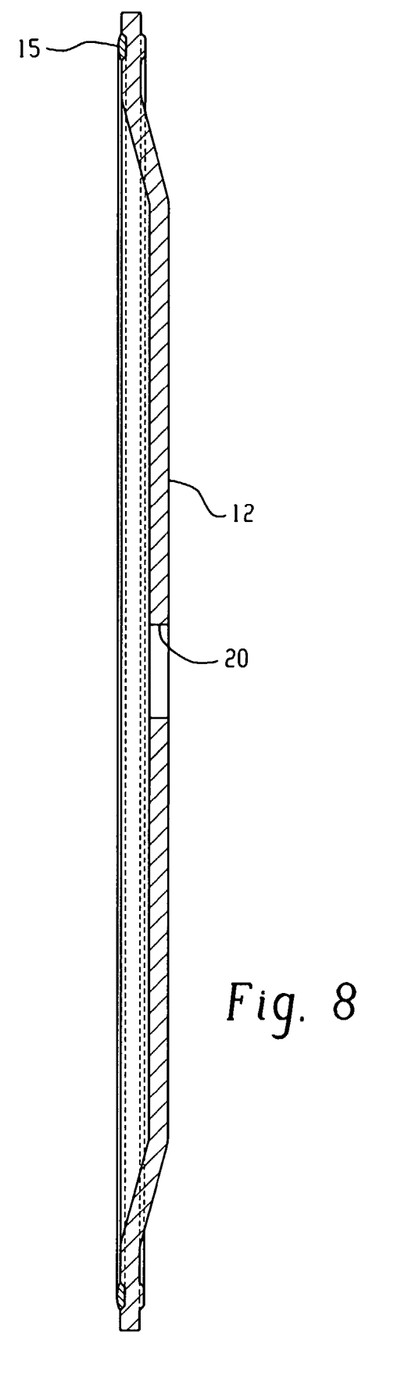
FIG. 8 is a side cross section view of the knife blank, wherein a second material has been applied to the groove according to FIG. 7 and wherein the knife blank has been formed into a cup shape.
Figure 9:
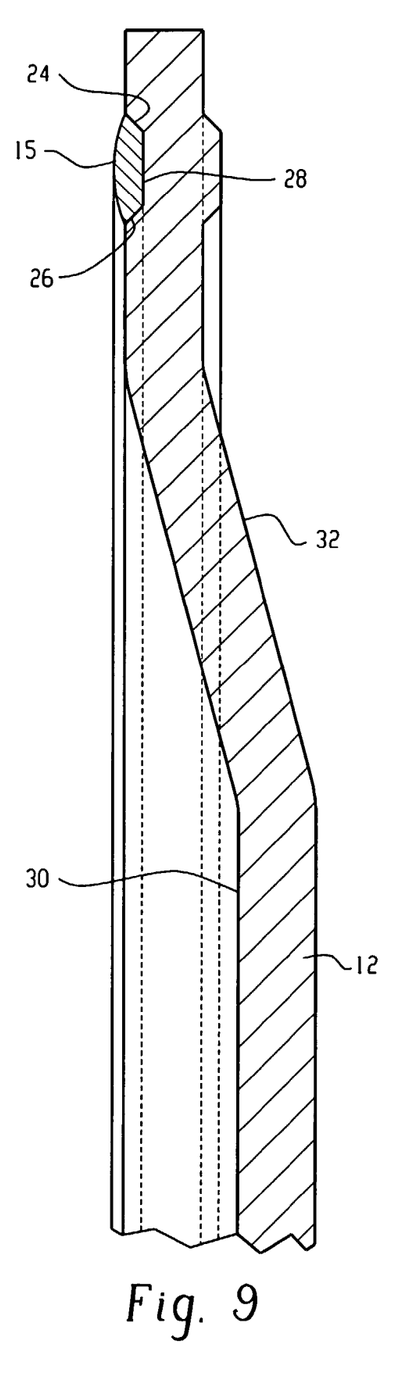
FIG. 9 is an enlarged view of the upper portion of FIG. 8.

Referring to FIGS. 8 and 9, the knife blank 29 may be formed into a cup shape having an interior side 30 and an exterior side 32. Forming the knife blank into the geometry shown in FIGS. 8 and 9 adds strength to the resulting slicer knife and may reduce the amount of material that needs to be machined near the circumferential edge of the knife blank.

Figure 10:
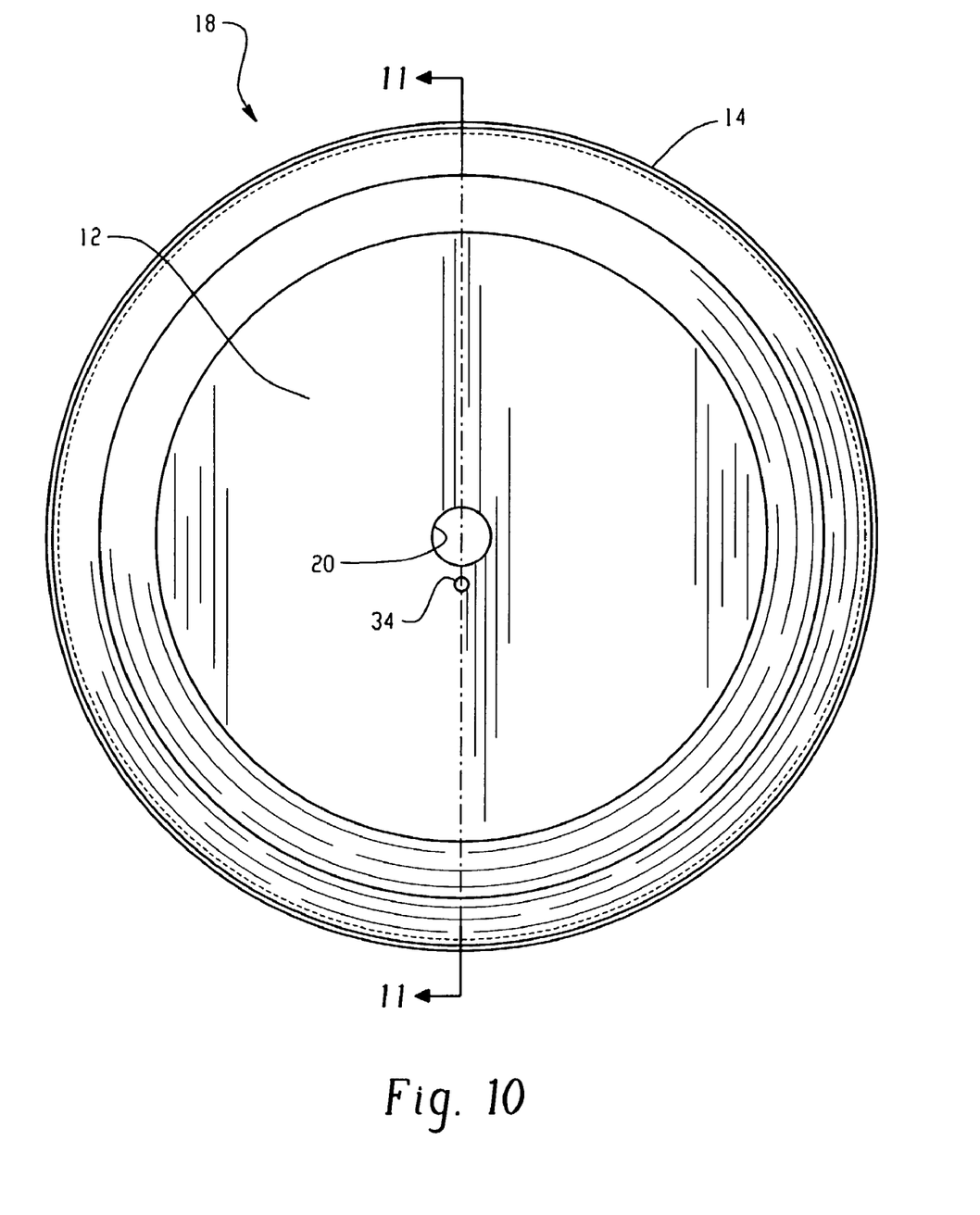
FIG. 10 is a top view of the knife blank of FIG. 8, wherein the perimeter region of the knife blank has been machined to expose the second material at the outer edge of the knife blank.
Figure 11:
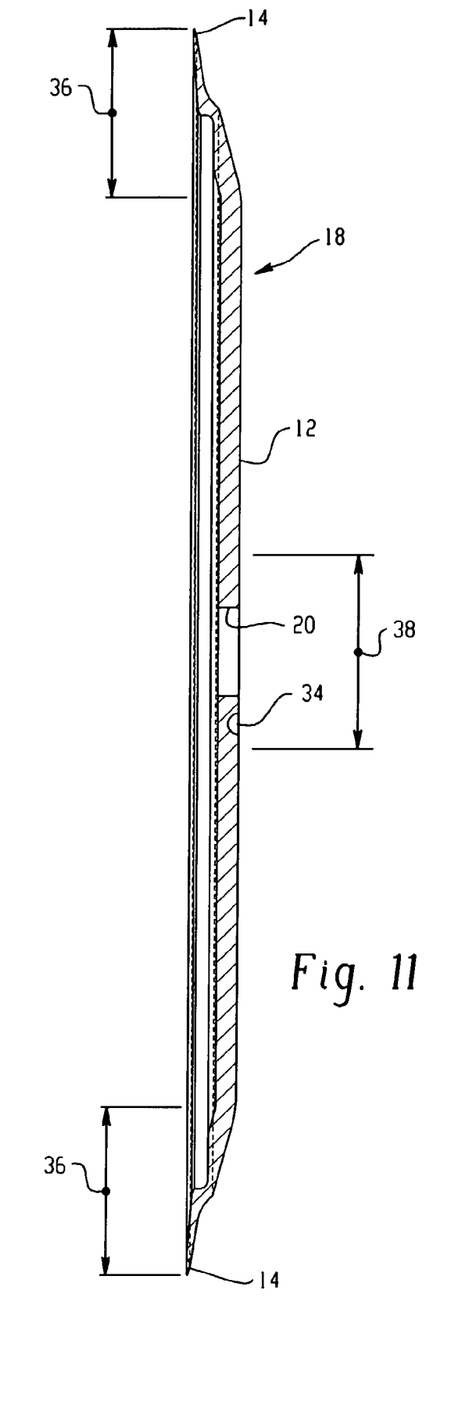
FIG. 11 is a side cross section view of the knife blank of FIG. 10 along line 10—10.
Figure 12:
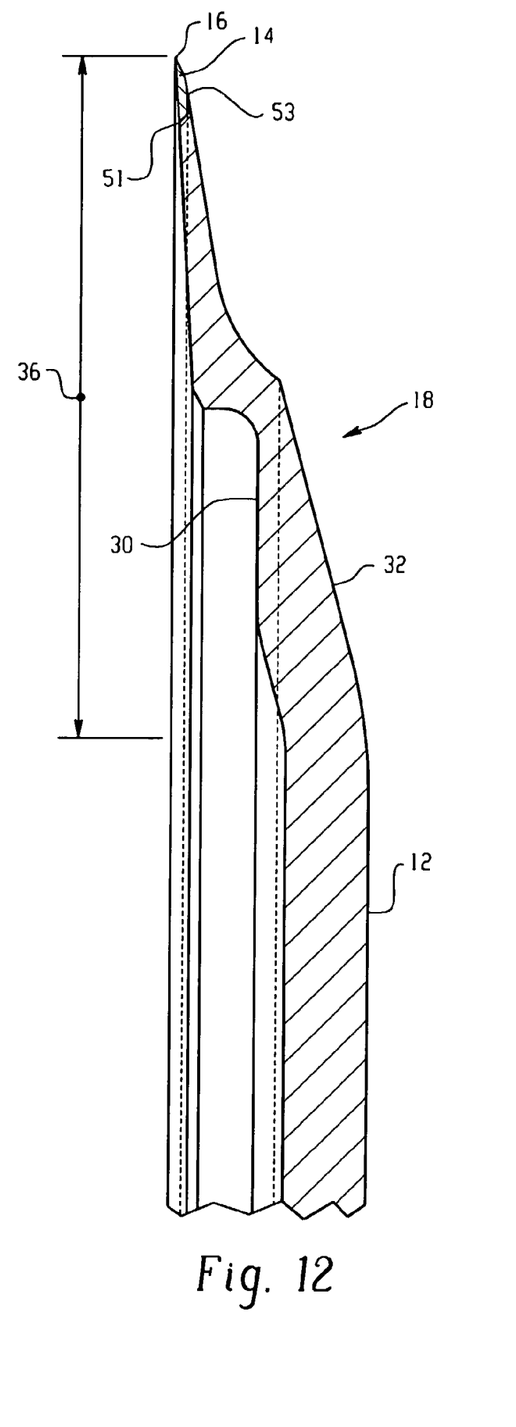
FIG. 12 is an enlarged view of the upper portion of FIG. 11.

Referring to FIGS. 10–12, after the second material has been applied to the groove 22, the knife blank may be machined so as to expose the second material at a substantially circular edge of the slicer knife 10. In one example, the machining step may be performed by rotating the knife blank about its central axis and moving a cutting tool along the surface of the knife blank from the outer radius of the knife blank toward the inner radius of the knife blank. The machining process may be repeated for both the interior side 30 and the exterior side 32 of the knife blank. As material from the knife blank is removed by the machining process, the outer radius of the knife blank is reduced until the second material located in the groove 22 is eventually exposed at the edge of the slicer knife 10. Further, the machining procedure on both sides of the knife in a region of metallurgical bonding between the knife edge portion and the knife base portion may be used to create a continuous transition surface portion 51 in the region on side 30 of the knife and a continuous transition surface portion 53 in the region on side 32 of the knife. These continuous transition surface portions, while not necessarily planar, are preferably smooth, having no touch discernible gap or crevice to provide a clean transition from the base portion of the knife to the knife edge portion. The formation of such continuous transition surface portions is advantageous from a sanitation and cleanability standpoint.

In addition, a pin receiving hole 34 may be drilled near the center hole 20 of the knife blank for rotationally coupling the slicer knife 10 to a food slicing device. However, it is recognized that the pin receiving hole may not be necessary depending upon the technique to be used to mount the resulting knife to a food slicer. For example, where the center hole 20 is formed non-circular, the edges of the hole 20 could couple with a rotational member of the food slicer for imparting rotational movement to the resulting knife.

In one embodiment, the resulting knife is not machined along its entire radius, but is instead machined only along a perimeter region 36 and a central region 38. The perimeter region 36 may be a region extending from the outer edge of the knife inward to an inner radius that is greater than or equal to about 60% of the final machined radius of the slicer knife 10. The central region 38 may be a region extending from the center of the knife outward toward an outer radius that is less than or equal to about 25% of the final machined radius of the slicer knife 10. In another variation, the perimeter region 36 may be a region extending from the outer edge of the knife inward to an inner radius that is greater than or equal to about 70% of the final machined radius of the slicer knife 10 and the central region 38 may be a region extending from the center of the knife outward toward an outer radius that is less than or equal to about 20% of the final machined radius of the slicer knife 10. In such embodiments, the reduced knife machining may result in savings in manufacturing costs.

The second material, which has been exposed at the circumferential edge of the slicer knife 10 by the machining step, may then be sharpened to form the substantially circular cutting edge 16 of the slicer knife 10.

In an alternative method, an additional step of heating the groove 22 before applying the second material to the groove 22 may be performed, with the groove being heated to temperature in a range of about 450° F. to about 550° F. Such heating could take place on selected portions of the groove 22 at a time, namely the portion to which the second material is about to be applied. Thus, while each portion of the groove 22 would be heated prior to applying the second material therein, the steps of groove heating and applying the second material could take place simultaneously relative to different parts of the groove 22.

In another alternative method, an additional step of heating the circumferential edge of the knife blank 18 after forming the knife blank into a cup shape may be performed. This heating step may relieve stress in the circumferential edge of the knife blank that results from the forming of the knife blank. In an embodiment that uses a 304L SST as the first material and Stellite 6 as the second material, the circumferential edge of the knife blank 18 can be heated to a temperature in a range of about 700° F. to about 800° F. in order to achieve the proper stress relief.

In the resulting knife 10 the outer edge portion 14 of the knife may be described as permanently secured to the interior base portion 12 of the knife because the two portions could not be separated without destroying the knife.

It is to be clearly understood that the above description is intended by way of illustration and example only and is not intended to be taken by way of limitation. Other changes and modifications could be made, including both narrowing and broadening variations and modifications of the appended claims.

For example, while the primary manufacturing technique described utilizes a groove into which the second material is applied, it is recognized that the second material could be applied directly to the radially outer edge of a disc shaped base in cases where the radially outer edge is of suitable thickness to permit the second material to be built up by, for example, a deposition welding process. As another example, the second material could first be formed into a solid ring-shaped member and the inner edge of the ring-shaped member could be welded to the outer edge of a disc-shaped base of the first material. In both examples suitable machining could then be used to provide continuous surface portions on both sides of the knife in the region of metallurgical bonding.

The invention claimed is:

1. A method of manufacturing a substantially circular slicer knife, comprising the steps of:
   (a) providing a knife base of a first material, the knife base having a continuous groove spaced from an outer peripheral edge of the knife base;
   (b) applying a second material to the continuous groove of the knife base via a welding process to metallurgically bond the second material to the knife base, forming a knife blank; and
   (c) machining the knife blank to expose the second material along an outer edge of the knife and sharpening the outer edge to form a continuous cutting edge defined by the second material and suitable for slicing food product.

2. The method of claim 1, further comprising the step of heating the continuous groove before step (b).

3. The method of claim 1, wherein the continuous groove into which the second material is applied has spaced lateral walls, each lateral wall of the continuous groove forming a respective angle with a plane defined by a bottom of the continuous groove, each respective angle in a range of between about 125° and about 145°.

4. The method of claim 1, wherein an exposed width of the continuous groove into which the second material is applied is greater than a width of a bottom of the continuous groove.

5. The method of claim 1, where the continuous groove into which the second material is applied has spaced lateral walls, the lateral walls of the continuous groove forming an angle there between in a range of between about 70° and about 110°.

6. A method of manufacturing a substantially circular slicer knife, comprising the steps of:
(a) providing a knife base of a first material, the knife base including a continuous groove spaced radially inward of an outer edge of the knife base;
(b) applying a second material to the continuous groove of the knife base so as to metallurgically bond the second material directly to the first material of the knife base without intervening material to complete the bond, forming a knife blank; and
(c) machining the knife blank to eliminate first material that is located radially outward of the continuous groove to form a continuous peripheral cutting edge defined by the second material, wherein the knife includes an interior side and an exterior side and the second material is exposed in a ring-shape on both the interior side and the exterior side,
wherein the continuous groove of the knife base is configured such that a region of metallurgical bonding formed between the first material and the second material of the knife includes a portion that angles radially outwardly when moving from the interior side of the knife to the exterior side of the knife.

7. The method of claim 6, further comprising the step of heating at least a portion of the knife base prior to step (b).

8. The method of claim 6, wherein step (b) involves the use of a plasma transferred arc welding process.

9. The method of claim 6, wherein in step (c) only a perimeter region and/or a central region of the knife blank are machined, the perimeter region extending from an outer edge of the knife blank to an inner radius that is greater than or equal to about 60% of a final radius of the slicer knife, the central region extending from a center of the knife blank to an outer radius that is less than or equal to about 25% of the final radius of the slicer knife.

10. The method of claim 9, wherein the perimeter region extends from the outer edge of the knife blank to an inner radius that is greater than or equal to about 70% of the final radius of the slicer knife and the central region extends from the center of the knife blank to an outer radius that is less than or equal to about 20% of the final radius of the slicer knife.

11. The method of claim 6, wherein the knife base of step (a) is substantially circular and includes a center hole.

12. The method of claim 6, wherein step (c) includes machining both the interior side and the exterior side of the knife blank in a region of metallurgical bonding between the knife base and the second material to create a first continuous transition surface portion on the interior side of the knife and a second continuous transition surface portion on the exterior side of the knife.

13. A method of manufacturing a substantially circular slicer knife, comprising the steps of:
(a) providing a knife base of a first material;
(b) applying a second material to the knife base so as to metallurgically bond the second material directly to the first material of the knife base without any intervening material, forming a knife blank; and
(c) machining the knife blank to form a continuous cutting edge defined by the second material, wherein the knife includes an interior side and an exterior side and the second material is exposed in a ring-shape on both the interior side and the exterior side,
wherein the applying and machining steps are performed so as to result in a knife in which the second material has an unsupported radial width of at least ¼" along a radially outer portion of the knife;
wherein the knife base is configured such that a region of metallurgical bonding formed between the first material and the second material of the knife includes a portion that angles radially outwardly when moving from the interior side of the knife to the exterior side of the knife.

14. The method of claim 13 including the step of machining both the interior side and the exterior side in a region of metallurgical bonding between the first material and the second material to create a first continuous transition surface portion on the interior side of the knife and a second continuous transition surface portion on the exterior side of the knife.

15. The method of claim 14 wherein the first continuous transition surface portion is smooth, being free of any touch discernible gap or crevice.

16. The method of claim 15 wherein the second continuous transition surface portion is smooth, being free of any touch discernible gap or crevice.

17. A method of manufacturing a substantially circular slicer knife, comprising the steps of:
(a) providing a knife base of a first material, the knife base including a continuous groove spaced radially inward of an outer edge of the knife base;
(b) applying a second material to the continuous groove of the knife base via a welding process to metallurgically bond the second material to the knife base, forming a knife blank in which the second material is spaced from the periphery of the knife blank; and
(c) machining the knife blank to eliminate first material that is located radially outward of the continuous groove to form a continuous peripheral cutting edge defined by the second material, with the second material exposed in a ring-shape on both a first side and a second side of the knife;
wherein step (c) includes machining both the first side and the second side of the knife blank in a region of metallurgical bonding between the knife base and the second material to create a first continuous transition surface portion on the first side of the knife and a second continuous transition surface portion on the second side of the knife and wherein the first continuous transition surface portion is smooth, being free of any touch discernible gap or crevice and wherein the second continuous transition surface portion is smooth, being free of any touch discernible gap or crevice.

18. A method of manufacturing a substantially circular slicer knife, comprising the steps of:
(a) providing a knife base of a first material;
(b) applying a second material to the knife base so as to metallurgically bond the second material to the knife base, forming a knife blank; and
(c) machining the knife blank to form an unsharpened knife having an unsharpened continuous outer edge formed of the second material, wherein the unsharpened knife includes an interior side and an exterior side and the second material is exposed in a ring-shape on both the interior side and the exterior side, the machining step is performed such that the second material has a first radial width on the interior side and a second radial width on the exterior side;
(d) sharpening the unsharpened continuous outer edge to produce a sharpened continuous cutting edge formed of the second material, wherein the first radial width and the second radial width are each sufficient such that during the sharpening operation only the second material is worked.

19. The method of claim 18 wherein step (c) includes machining both the interior side and the exterior side in a region of metallurgical bonding between the first material and the second material to create a first continuous transition surface portion on the interior side of the knife and a second continuous transition surface portion on the exterior side of the knife.

20. A method of manufacturing a substantially circular slicer knife, comprising the steps of:
   (a) providing a knife base of a first material;
   (b) applying a second material to the knife base so as to metallurgically bond the second material to the knife base, forming a knife blank; and
   (c) machining the knife blank to produce an unsharpened knife having an unsharpened continuous outer edge defined solely by the second material, wherein the unsharpened knife includes an interior side and an exterior side and the second material is exposed in a ring-shape on both the interior side and the exterior side;
   (d) sharpening the unsharpened continuous edge by working only the second material so as to produce a sharpened continuous cutting edge defined solely by the second material.

21. The method of claim 20 wherein step (c) includes machining both the interior side and the exterior side in a region of metallurgical bonding between the first material and the second material to create a first continuous transition surface portion on the interior side and a second continuous transition surface portion on the exterior side.

22. A method of manufacturing a substantially circular slicer knife, comprising the steps of:
   (a) providing a knife base of stainless steel;
   (b) applying a cobalt based alloy material to the knife base so as to metallurgically bond the cobalt based alloy material to the knife base, forming a knife blank; and
   (c) machining the knife blank to produce an unsharpened knife having an unsharpened continuous outer edge defined by the cobalt based alloy material, the unsharpened continuous outer edge including an interior side and an exterior side that angle toward each other;
   (d) sharpening the unsharpened continuous outer edge by working both the interior side and the exterior side so as to produce a sharpened continuous cutting edge defined at an intersection point of the interior side and the exterior side.

23. The method of claim 22 wherein step (c) includes machining both the interior side and the exterior side in a region of metallurgical bonding between the first material and the second material to create a first continuous transition surface portion on the interior side and a second continuous transition surface portion on the exterior side.

24. A method of manufacturing a substantially circular slicer knife, comprising the steps of:
   (a) providing a knife base of a first material, the knife base including a continuous groove thereon, the continuous groove having spaced apart inner and outer sidewalls, both sidewalls spaced radially inward and away from an outermost edge of the knife base, an exposed width of the continuous groove is greater than a width of a bottom of the continuous groove;
   (b) applying a second material into the continuous groove of the knife base to metallurgically bond the second material to the knife base forming a knife blank; and
   (c) machining the knife blank to eliminate first material, including the outer sidewall, that is located radially outward of the outer sidewall to form a continuous cutting edge defined by the second material, wherein the knife includes an interior side and an exterior side and the second material is exposed in a ring-shape on both the interior side and the exterior side.

* * * * *